July 13, 1971  J. C. KREJCI  3,592,597

CARBON BLACK PROCESS AND REACTOR

Filed May 23, 1968

INVENTOR.
J. C. KREJCI
BY
Young & Quigg
ATTORNEYS

United States Patent Office 3,592,597
Patented July 13, 1971

3,592,597
CARBON BLACK PROCESS AND REACTOR
Joseph C. Krejci, Phillips, Tex., assignor to
Phillips Petroleum Company
Filed May 23, 1968, Ser. No. 731,523
Int. Cl. C09c 1/50
U.S. Cl. 23—209.4                            10 Claims

ABSTRACT OF THE DISCLOSURE

Process and apparatus for the production of carbon black wherein an oxygen-containing gas, with or without fuel, is introduced into an axial zone of a reactor and passed through a diametrally restricted section of said zone wherein it is commingled with a hydrocarbon feed, the mixture passed into a combustion zone and contacted therein with hot combustion gases, and the resulting mass passed into a reaction zone wherein the hydrocarbon feed is pyrolytically decomposed into carbon black.

---

This invention refers to process and apparatus for producing carbon black. In one of its more specific aspects it refers to an improved process and apparatus for the production of carbon black.

Carbon black is produced by the pyrolysis of a hydrocarbon in the presence of combustion gases by generally enveloping the hydrocarbon in the mass of combustion gases and transferring the heat from the combustion gases to the hydrocarbon to effect the pyrolysis.

Various types of reactors have been devised in which to produce carbon black. One type of reactor has come to be known as the "axial tunnel reactor." Basically, this reactor consists of three sections in axial, contiguous relationship, the hydrocarbon being introduced at one end of the reactor into the axial section, the carbon black being recovered from the opposite end of the reactor from the reactor section. Between the axial section and the reactor section is the combustion section through which a portion of the combustible gases are introduced into the reactor. While various other names many be used in the designation of this type of reactor and its sections, axial tunnel reactors, as referred to herein, are meant to be of this general configuration. In any instance, some of the hydrocarbon feed may be introduced into both the axial section and the combustion section. Similarly, some portion of either air or combustible gas, or both, may be introduced into both the axial section and the combustion section.

There has now been developed an axial type reactor which incorporates improvements in its construction, these improvements resulting in the production of carbon black of improved quality at preferred yields while minimizing the yield of undesirable products.

There is provided in accordance with this invention an axial type carbon black reactor having an axial tunnel in which there is positioned a choke or restriction, this choke or restriction being positioned peripheral to the internal wall of the axial tunnel to form a passageway of decreased cross-sectional area within the axial tunnel, said passageway being adapted to permit the projection of the make-oil nozzle therethrough and to direct gas therethrough proximate the oil discharge nozzle, at elevated velocities.

By use of this apparatus there is provided a process for the production of carbon black in which there is injected into the axial tunnel a first portion of the combustible gases, or air alone, the gases being caused to flow at high velocities proximate the point of discharge of the make-oil nozzle to form a reactant mixture, introducing the reactant mixture into a combustion zone in which a second portion of combustion gases are introduced, and passing the resulting mass into a subsequent reaction zone wherein a principal portion of the carbon black is formed.

In one embodiment of this invention, the make-oil nozzle is adjustable longitudinally along the length of the passageway through the choke.

In another embodiment of this invention, the passageway through the choke is sized to impart varying velocities to the fluid passing therethrough, the passageway varying in diameter along its length.

Accordingly, it is an object of this invention to provide an improved apparatus for the production of carbon black.

It is another object of this invention to provide an improved process for the production of carbon black.

These, and other objects, will become more readily apparent from the following discussion.

The choke of this invention is particularly adaptable to the carbon black process in which some appreciable quantity of the air and combustible gas or fuel is introduced into the axial tunnel of the reactor. This is not to preclude some appreciable portion of the air and fuel from being introduced into the combustion chamber, nor is it to preclude some appreciable portion of the feed charge stock being introduced into the combustion chamber.

The beneficial effect of the choke appears to result from two effects. The first involves contacting the air, or the gases, flowing through the choke at high velocity with the make-oil; the second seemingly involves the minimizing of combustion gas currents sweeping back from the combustion zone into the axial section of the reactor.

In any instance, the choke of this invention will occupy a position within the axial section, and will be variably positionable along the length thereof, in such a manner as to occupy any position, in respect to its downstream terminal edge, from a point proximate the maximum upstream position of the oil make nozzle to at least the upstream limit of the combustion chamber.

Accordingly, as the result of these two factors, that is, the contacting of charge oil with high velocity axial air and, the minimizing of the back-sweep of combustion gases into the axial section of the reactor, it has been found that the apparatus and process of this invention are particularly effective in increasing the structure of the carbon black produced. By structure is meant that property measured by the dibutyl phthalate absorption number as defined by ASTM Tentative Test Method designated D 2414–65T, issued 1965, or by any other property correlating therewith and with carbon black structure such as mineral oil absorption structure index, and the like.

Reference is now made to the attached drawings which show two embodiments of this invention.

Figure 1:
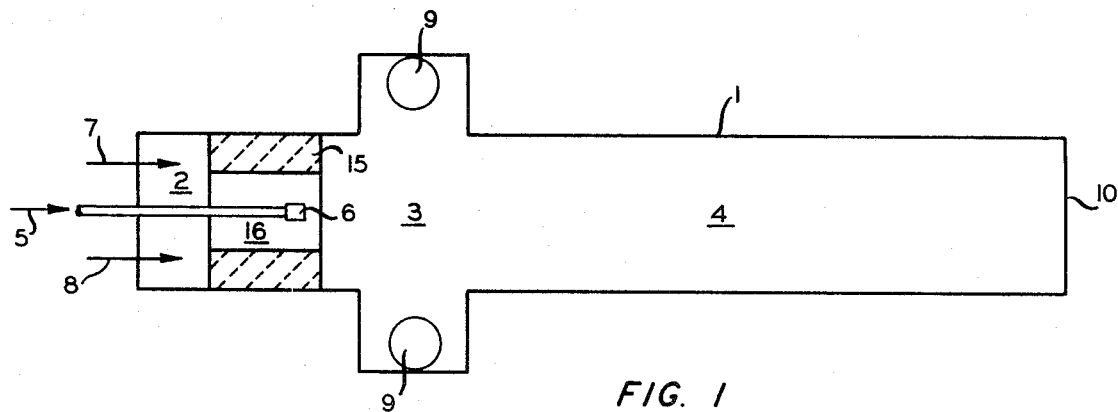
FIG. 1 is an elevation of an axial tunnel reactor having the choke of this invention installed therein.

Referring now to FIG. 1, there is shown the general outline of a carbon black reactor 1, having axial section 2, combustion section 3 and reaction section 4. Charge oil, or make-oil, is injected into axial section 2 through conduit 5 which is equipped at its discharge end with nozzle 6. Axial section 2 is also adapted for the introduction of air thereinto through conduit 7 and fuel gas through conduit 8, these commingling in section 2.

Combustion section 3 is adapted with entries 9 which consist of one or more points for the introduction of combustion air, and fuel or combustible gases, and, if desired, some portion of the make-oil. While shown tangentially, such entries may also be arranged radially, or both. Reactor section 4 is adapted with outlet 10 through which the carbon black produced in section 4 is removed from the reactor.

Positioned within axial tunnel section 2 is choke 15 which is formed, for example, of a cylinder positioned with its outer wall adjacent the interior wall of axial zone 2. The passageway 16 through the cylinder is large enough to accommodate the withdrawal of nozzle 6 therethrough. Commingled gases from conduit 7 and 8 pass through the passageway 16 of choke 15, their velocities being increased due to the smaller flow area of the passageway 16.

Both choke 15 and nozzle 6 are adjustable independently of each other along the length of axial tunnel 2. Choke 15 is adapted for adjustment in location from any position from the inlet wall of axial tunnel 2 to the zone boundry line between axial section 2 and combustion section 3. Make-oil nozzle 6 is similarly adjustable. It will be appreciated that a considerable increase in velocity is imparted to that mixture of gases passing through passageway 16 of choke 15 as compared to that velocity imparted to the gases when passing through the unrestricted portion of axial tunnel 2. It will be further appreciated that there is a considerable change in direction effected in the flow of the gases through the passageway 16 of choke 15, that is, depending upon the quantity of gases introduced into axial section 2, turbulent flow results as the velocity of flow of these gases is increased in flowing through coke 15. Similarly, depending upon location of make-oil nozzle 6 within coke 15, a considerable effect can be produced in respect to the commingling of the air and gas with the make-oil discharged from nozzle 16.

Due to the length of choke 15 in relation to the length of the axial tunnel, it is preferable that choke 15 be positionable to encompass nozzle 6 at its most withdrawn position from combustion chamber 3.

It will be further appreciated that, depending upon the flow area of passageway 16 through choke 15, a wide pattern of flows can be established in respect to obtaining laminar or turbulent flow through passageway 16 of choke 15.

Figure 2:
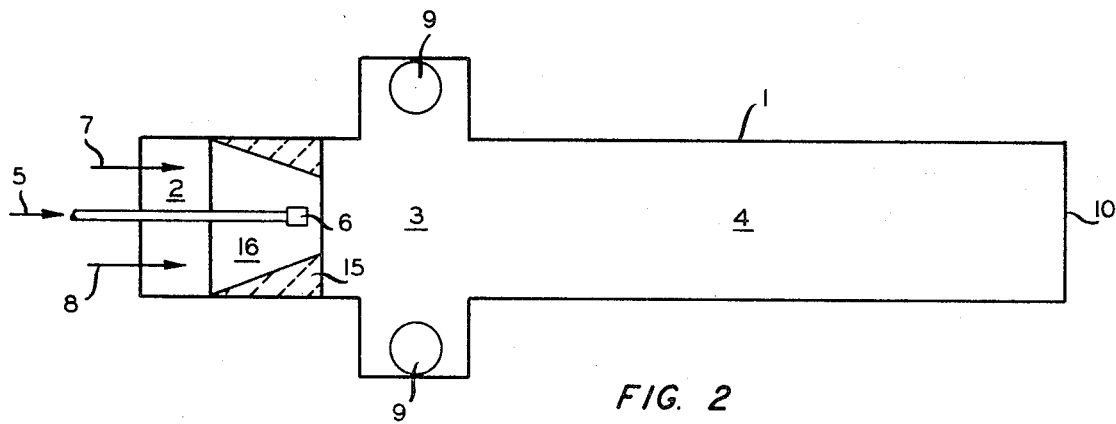
FIG. 2 is an elevation of another embodiment of the choke of this invention installed in an axial tunnel reactor.

FIG. 2 illustrates another embodiment of the invention in which like numbers are used to denote like parts as explained in reference to FIG. 1.

In this instance the passageway 16 through choke 15 is of varying diameter through its axial length, and forms a truncated cone. In this instance, a more gradual change in velocity is imparted to the gas with the result that the turbulence imparted to the air and gas is probably lessened. However, the configuration of passageway 16 through the choke is more influential in directing the discharge of flow of the air and gas. This is particularly true if nozzle 6 is placed at the downstream edge of choke 15, such that the gases are directed angularly across nozzle 6 in impinging relationship to the material discharged from nozzle 6.

As previously mentioned, the apparatus and method of the subject invention permit wider range of reactor operability, have an effect upon the structure of carbon black production, and have an effect upon the yield of carbon black produced from the process in terms of percent carbon converted to carbon black. These effects are shown by the following examples.

EXAMPLE I

A carbon black reactor of the previous description was operated with, and without, a choke on comparable feedstocks under the conditions indicated below. The diameter of the axial tunnel was 15 inches.

In one run, a choke having a passageway of 4 inches diameter was placed in the tunnel at a distance of 14 inches from the inlet to the combustion chamber; that is, the distance from the downstream side of the choke to the inlet of the combustion chamber was 14 inches. The make-oil nozzle of the spray type was located in alignment with the downstream side of the choke such that the gases, upon leaving the passageway of the choke, were swept through and across the spray discharge from the make-oil nozzle.

In the comparison run, the make-oil nozzle was similarly located within the axial tunnel but no choke was employed. Operating conditions were as follows:

|  | Run Number | |
|---|---|---|
|  | 1 | 2 |
| Choke | None | At 14'' |
| Nozzle position, in | 14 | 14 |
| Oil feed rate, g.p.h | 350 | 376 |
| Oil inlet temp., ° F | 400 | 405 |
| Axial air, M s.c.f.h | 45 | 45 |
| Comb. air, M s.c.f.h | 185 | 185 |
| Comb. gas, M s.c.f.h | 14 | 14 |
| Air to oil ratio, s.c.f./gal | 657 | 612 |
| Reactor length, in | *84 | 90 |
| Yield data: | | |
| Yield, lb./gal | 4.14 | |
| Conversion, percent | 44 | |
| Tests on carbon black: | | |
| N₂SA, m.²/g | 87 | 86 |
| DBP, cc./100 gm | 143 | 153 |
| Photelometer, percent | 89 | 95 |

*There was deposited in the third, or reactor section, a small amount of undesirable carbonaceous material not possessing the qualities of commercial carbon black.

From the above data, it will be seen that the use of the choke permitted operation at higher make-oil rates without the formation of undesirable carbonaceous deposits. In other words, the choke extends the range of operability of the reactor by permitting a higher charge rate within the limits of acceptable product formation.

These data further indicate that when operating the reactors at different length to achieve comparable degrees of after-treat, the structure of the carbon black produced when using the choke was greater although the surface areas were comparable.

EXAMPLE II

A second set of runs was made in the same reactor as employed above, a choke positioned at 14 inches being employed in each, the choke having a passageway diameter of 4 inches, the nozzle also being positioned at 14 inches. Results were as follows:

| Run No | 3 | 4 | 5 |
|---|---|---|---|
| Oil feed rate, g.p.h | 351 | 376 | 376 |
| Oil Inlet Temp., ° F | 405 | 400 | 405 |
| Axial air, M s.c.f.h | 35 | 55 | 45 |
| Comb. air, M s.c.f.h | 175 | 175 | 175 |
| Comb. gas, M s.c.f.h | 13.2 | 13.2 | 14 |
| Air/oil, s.c.f./gal | 598 | 612 | 587 |
| Reactor length, in | 83 | 88 | 90 |
| Yield data: | | | |
| Yield, lb./gal | 4.97 | 4.92 | |
| Conversion, percent | 52.2 | 53.7 | |
| Product quality: | | | |
| Photelometer, percent | 90 | 92 | 95 |
| N₂SA, m.²/g | 79 | 92 | 86 |
| DBP, cc./100 gm | 146 | 159 | 153 |

In the above runs, the reactor length was varied from run to run in order to achieve approximately the same degree of after-treatment as reflected in the photelometer values. However, with the greater amount of axial air, in Run 4, the structure was considerably increased over that of Runs 3 and 5, as was the surface area, even at the somewhat shorter reactor length, in comparison to that used in Run number 5. This indicates that the increased velocity of the gases through the coke and around the nozzle, as effected by the choke, was influential in respect to the structure of the product carbon black, the yield of carbon black, and in respect to the percentage conversion realized.

EXAMPLE III

A third set of runs was made in the same reactor as employed in the previous runs, but employing a choke having a passageway of 4 inches diameter, located at 10 inches with the nozzle also being positioned at 10 inches. The feedstock was that used in the runs of Example II, which were comparable to that used in the runs of Example I.

Results were as follows:

| Run No. | 6 | 7 | 8 |
|---|---|---|---|
| Oil feed rate, g.p.h. | 351 | 351 | 352 |
| Oil inlet temp., °F | 400 | 400 | 400 |
| Axial air, M s.c.f.h | 35 | 45 | 55 |
| Comb. air, M s.c.f.h | 195 | 185 | 175 |
| Comb. gas, M s.c.f.h | 14.8 | 14 | 13.2 |
| Air to oil, s.c.f./gal | 655 | 655 | 653 |
| Reactor length, in | 71 | 71 | 74 |
| Yield data: | | | |
| Yield, lb./gal | 4.63 | 4.53 | 4.44 |
| Conversion, percent | 49 | 48.4 | 47.8 |
| Product quality: | | | |
| Photelometer, percent | 92 | 88 | 92 |
| $N_2SA$, m.$^2$/g | 96 | 98 | 100 |
| DBP, cc./100 gm | 146 | 150 | 151 |

These data show that when maintaining the reactors at approximately equivalent lengths, as required to obtain approximately equivalent aftertreatment, a significant increase in structure can be effected while maintaining comparable surface area.

Comparing the data of Example III with that of Example II, it will be seen that under comparable operating conditions, appreciable changes can be made to the structure and surface area of the carbon black under comparable after-treatment, by employing chokes at different distances from the combustion chamber.

EXAMPLE IV

To illustrate the effect of the choke in respect to positioning of the make-oil nozzle within the axial tunnel, the following runs were made producing ISAF blacks in the same reactor.

| | Run No. | |
|---|---|---|
| | 9 | 10 |
| Choke | No | Yes |
| Oil rate, g.p.h | 274 | 289 |
| Oil inlet temp., °F | 400 | 400 |
| Oil nozzle position, in | 11 | 10 |
| Axial air rate, M s.c.f.h | 45 | 45 |
| Comb. air rate, M s.c.f.h | 185 | 185 |
| Comb. gas rate, M s.c.f.h | 12.3 | 12.3 |
| Reactor length, in | 58 | 54 |
| Oil, BMCI | 121 | 124 |
| Yield, lb./gal | 3.76 | 4.13 |
| Product quality: | | |
| Photelometer, percent | 92 | 92 |
| $N_2SA$, m.$^2$/g | 118 | 117 |
| DBP, cc./100 g | 148 | 152 |

These data indicate that in Run 10, the nozzle was 1 inch closer to the combustion chamber than in Run 9. At comparable reactor lengths to produce comparable aftertreating, one would expect an accompanying decrease in structure at the more forward position of the make-oil nozzle. However, because of the use of the choke, an increase in structure was obtained as was an increase in yield of carbon black per gallon of oil charged.

EXAMPLE V

To illustrate the effect of the choke in respect to positioning within the axial tunnel on blacks of other quality, two comparable runs were made producing HAF blacks in the same reactor. Data were as follows.

| | Run No. | |
|---|---|---|
| | 11 | 12 |
| Choke | None | Yes |
| Oil rate, g.p.h | 383 | 348 |
| Oil inlet temp., °F | 400 | 400 |
| Oil, BMCI | 121 | 124 |
| Oil nozzle position, in | 19 | 10 |
| Axial air rate, M s.c.f.h | 65 | 35 |
| Comb. air rate, M s.c.f.h | 185 | 175 |
| Comb. gas rate, M s.c.f.h | 12.3 | 11.7 |
| Reactor length, in | 79 | 90 |
| Yield, lb./gal | 4.37 | 4.77 |
| Product quality: | | |
| Photelometer, percent | 87 | 90 |
| $N_2SA$, m.$^2$/g | 86 | 83 |
| DBP, cc./100 g | 149 | 150 |

These data show that while varying reactor length considerably, but, in effect, not sufficiently to compensate for the 9 inches change in nozzle location between the two runs, comparable products were made in respect to the various properties. However, the structure in Run 12, at the 10 inch nozzle location, would be expected to have decreased. That it did not is due to the effect of the choke.

Generally, it may be said that the choke may be positioned at any point within the axial tunnel while still permitting the combustible gas and free oxygen containing gases to be introduced into the axial section upstream of the choke or into the passageway of the choke. However, the choke appears to serve the additional purpose of minimizing backflow from the combustion chamber into the axial zone if placed with its forward edge at or near the upstream edge of the combustion chamber of about 0.1 to about 2.0 times the diameter of the reaction zone.

The passageway of the choke may have any diameter less than the diameter of the axial tunnel, and may be of varying diameter as discussed above. However, it is preferable that the diameter of the passageway of the choke be related to the diameter of the axial tunnel such that the minimum free area of the passageway be from about 0.01 to about 0.50, preferably from about 0.02 to about 0.30 that of the axial section. By free area is meant the cross-sectional area of the passageway of the choke less that cross-sectional area of the make-oil nozzle which extends through the passageway. In any instance, the velocity through the choke should preferably be in the range of turbulent flow in terms of Reynolds number.

The choke and its passageway should be of sufficient length to impart proper direction of flow to the gases passing therethrough. Chokes having a length of from about 4 inches to about 8 inches, but in any instance, of a length shorter than the axial section, will be found to be satisfactory, the reactants being preferably introduced into the axial section in its upstream portion and thereafter being caused to pass through the passageway of the choke, the passageway being of smaller diameter than the diameter of that portion of the axial zone into which the reactants were introduced.

While this invention has been described in respect to certain specific aspects, such description is not intended to limit the invention thereto.

What is claimed is:

1. A process for the production of carbon black by the pyrolytic decomposition of a hydrocarbon feed by contacting said hydrocarbon feed with hot combustion gases produced by the oxidation of a fuel with a free oxygen-containing gas which comprises:
   (a) introducing an oxygen-containing gas into a first section of an axial zone of a carbon black reactor;
   (b) introducing hydrocarbon feed downstream of the locus of introduction of said gas into a diametrally restricted portion of said axial zone, said portion having a cross sectional area less than the cross sectional area of said first section;
   (c) passing said gas through said first section at a first velocity;
   (d) passing said gas through said diametrically restricted portion of said axial zone and into contact with said hydrocarbon feed at a velocity greater than said first velocity to form a reactant mass;
   (e) passing said reactant mass into a combustion zone having a diameter greater than the diameter of the axial section and into contact with hot combustion gases introduced through the periphery of said combustion zone under conditions to form carbon black;
   (f) passing the reactant mixture into a reaction zone wherein carbon black is formed; and
   (g) recovering the carbon black.

2. The process as defined in claim 1 in which said oxygen-containing gas is passed through said diametrally restricted portion of said axial zone at a substantially uniform velocity.

3. The process as defined in claim 1 which said oxygen-containing gas is passed through said diametrally restriction portion of said axial zone at an increasing velocity.

4. The process as defined in claim 1 in which said oxygen-containing gas is passed through said diametrally restricted portion of said axial zone in laminar flow.

5. The process as defined in claim 1 in which said oxygen-containing gas is passed through said diametrally restricted portion of said axial zone in turbulent flow.

6. The process as defined in claim 1 in which said oxygen-containing gas flows from said diametrally restricted portion of said axial zone angularly to and in impinging relationship to said hydrocarbon feed.

7. A carbon black reactor which comprises:
(a) an axial section adapted with conduit means for the introduction of at least one of fuel and air;
(b) a choke positioned within said axial section downstream from the locus of discharge of said conduit means for the introduction of said at least one of fuel and air, said choke being movably positionable along the longitudinal axis of said axial section;
(c) a hydrocarbon feed inlet conduit adapted to discharge within said choke;
(d) a combustion section having a diameter greater than the diameter of the axial section in axial contiguous alignment with said axial section;
(e) a combustion gas inlet conduit through the periphery of said combustion section;
(f) a reaction section in axial alignment with said combustion section and adapted with conduit means for recovery of carbon black.

8. The apparatus defined in claim 7 in which said choke comprises a cylinder of substantially uniform diameter.

9. The apparatus defined in claim 7 in which said choke comprises a cylinder having a diameter which diminishes from the upstream extremity of said choke to the downstream extremity of said choke.

10. The apparatus defined in claim 7 in which said hydrocarbon feed inlet is adjustable along the axis of said choke.

References Cited

UNITED STATES PATENTS

| | | | |
|---|---|---|---|
| 2,375,795 | 5/1949 | Krejci | 23—209.8 |
| 2,682,450 | 6/1954 | Sweigart et al. | 23—259.5 |
| 3,026,185 | 3/1962 | Takewell et al. | 23—259.5 |
| 3,079,236 | 2/1963 | Heller et al. | 23—209.4 |
| 3,235,334 | 2/1966 | Helmers | 23—209.4 |
| 3,256,065 | 6/1966 | Latham | 23—259.5 |
| 3,408,165 | 10/1968 | Hinson | 23—209.4 |

EDWARD J. MEROS, Primary Examiner

U.S. Cl. X.R.

23—259.5